United States Patent [19]

Beasley

[11] Patent Number: 4,600,063
[45] Date of Patent: Jul. 15, 1986

[54] DOUBLE-TAPER SLIP-ON DRILL STRING STABILIZER

[75] Inventor: Thomas R. Beasley, Houston, Tex.

[73] Assignee: Dailey Petroleum Services Corp., Houston, Tex.

[21] Appl. No.: 614,474

[22] Filed: May 29, 1984

[51] Int. Cl.$^4$ .............................................. E21B 17/10
[52] U.S. Cl. ...................................... 175/325; 166/241
[58] Field of Search ................... 175/325, 256, 257; 166/241, 301, 242, 217, 206, 218, 382; 308/4 A

[56] References Cited

U.S. PATENT DOCUMENTS

| | | | |
|---|---|---|---|
| 2,906,346 | 9/1959 | Johnston | 166/118 |
| 3,916,998 | 11/1975 | Bass et al. | 166/301 |
| 4,000,549 | 1/1977 | Brumley et al. | 175/325 |
| 4,101,179 | 7/1978 | Barron | 308/4 A |
| 4,105,262 | 8/1978 | Richey | 308/4 A |
| 4,131,167 | 12/1978 | Richey | 175/323 |
| 4,258,804 | 3/1981 | Richey et al. | 175/325 |
| 4,276,932 | 7/1981 | Salinger et al. | 166/217 X |
| 4,337,088 | 6/1982 | Moses | 75/128 A |
| 4,349,050 | 9/1982 | Bergstrom et al. | 138/147 |
| 4,378,135 | 3/1983 | Enen et al. | 308/4 A |
| 4,384,626 | 5/1983 | Derouin | 175/57 |

FOREIGN PATENT DOCUMENTS

| | | | |
|---|---|---|---|
| 1090325 | 11/1980 | Canada | 308/4 A |
| 2047775A | 4/1979 | United Kingdom . | |
| 2063422A | 11/1979 | United Kingdom . | |

Primary Examiner—Stephen J. Novosad
Assistant Examiner—David J. Bagnell
Attorney, Agent, or Firm—Arnold White & Durkee

[57] ABSTRACT

A slip-on stabilizer is provided for adjustable positioning along a drill collar. The stabilizer includes a body positioned around the drill collar with a threaded section on each end and at least one tapered inner surface with the tapering surface beginning at the end of the interior threads and tapered to a generally narrower interior diameter; a plurality of slip segments with at least one tapered surface complementary matching the tapered surface of the stabilizer body; a locking pin and threaded end caps forcing the slip segment toward the center of the stabilizer body thereby wedging the slip segments against the drill collar by screwing the end cap into the body and thereby clamping the stabilizer body assembly onto the drill collar.

14 Claims, 6 Drawing Figures

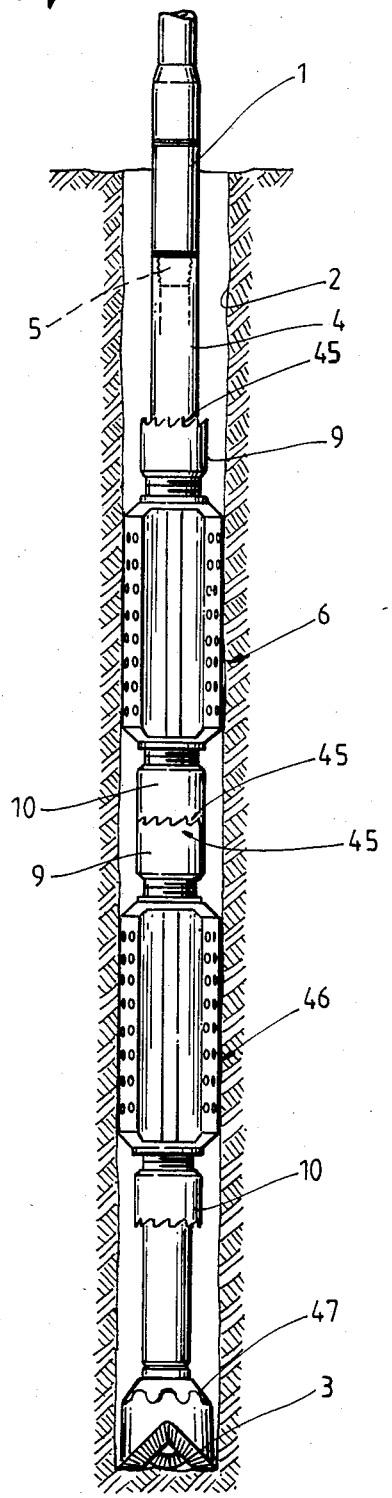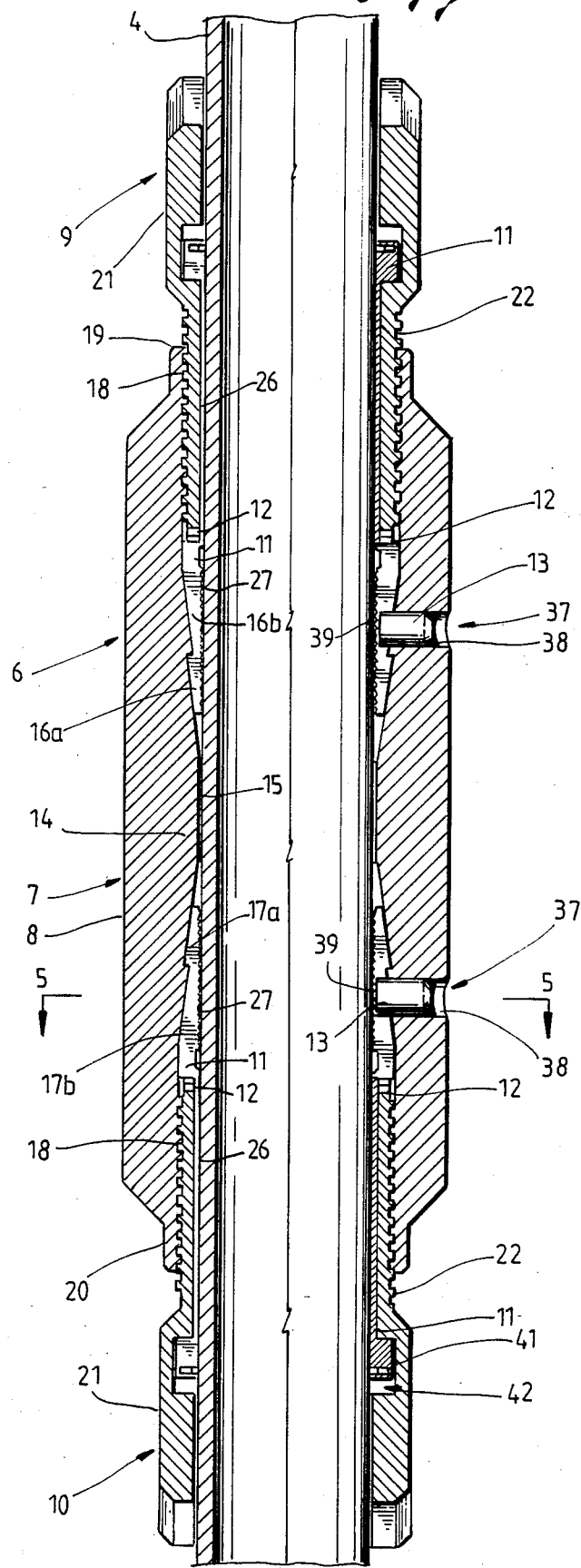

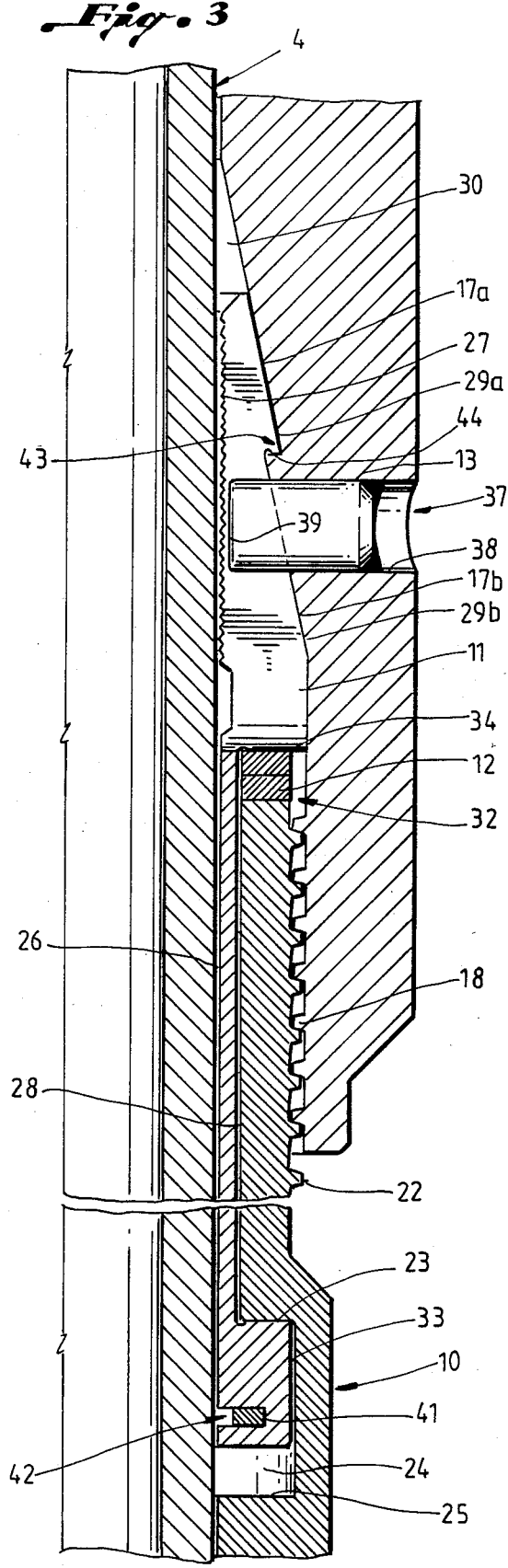
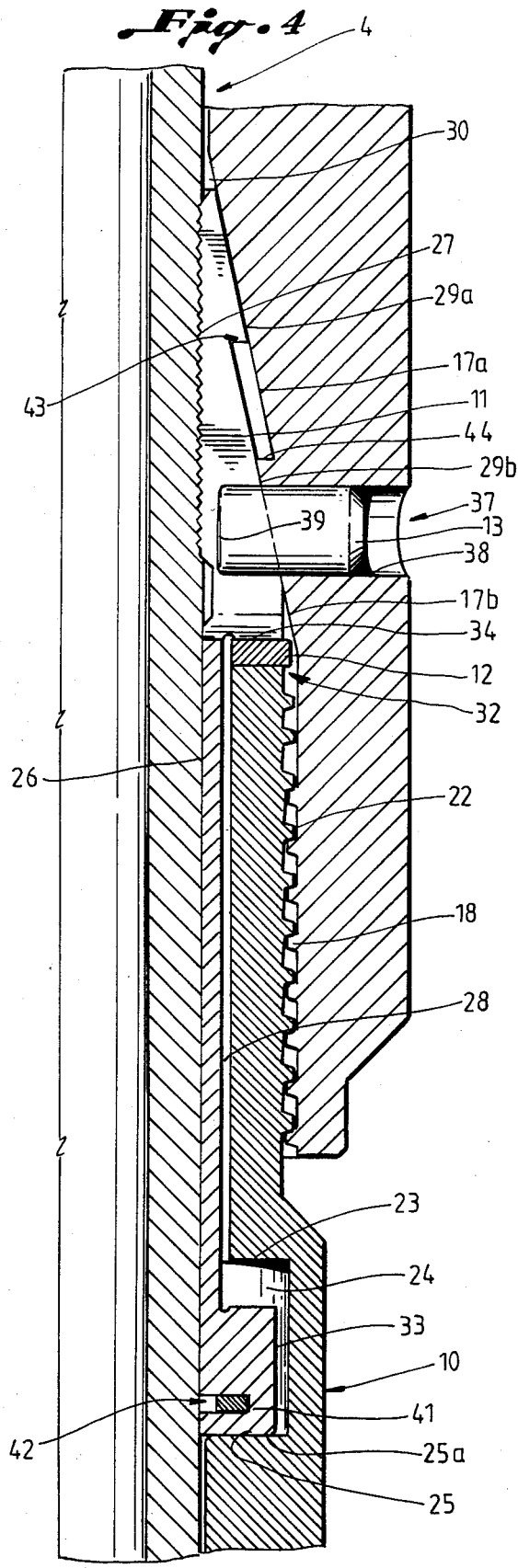

DOUBLE-TAPER SLIP-ON DRILL STRING STABILIZER

BACKGROUND OF THE INVENTION

A. Field of the Invention

This invention relates to a drill collar stabilizer used in oil well drilling operations, which can be positioned anywhere along a collar string. A stabilizer typically is equipped with exterior blades. The stabilizer is used as an aid in oil well drilling operations to prevent the drill collar from sticking to the walls of the borehole. The stabilizer also prevents eccentric action of the long drill string as the borehole is drilled to greater depths.

B. Background

Traditionally, stabilizers have been made up between drill collars as the drill string has been run into the hole. This arrangement, however, has had several undesirable features. For example, it requires an extra tool joint connection between the drill collars, and these connections increase the possible points of metal fatigue failure in the string. It also causes variations in the drill collar stand lengths which, in turn, increase joint make-up time and create unsafe operating conditions for drilling rig personnel. Additionally, the traditional stabilizer practice requires a special bottom hole assembly which increases drilling costs and does not permit adjustment of the stabilizer along the drill collar without changing drill collar standard lengths.

The first generation of releasable drill string stabilizers solved certain problems by permitting positioning anywhere along the drill string. At the same time, however, they created other problems in that a one piece wedge segment was placed in each end cap. This wedge segment required an inordinate amount of force to compress and properly position the wedge segment. The use of nonmagnetic materials, which are highly desirable in oil field work, created an additional problem in that the compressed one piece slip segment failed to regain its original shape and thus could not properly be positioned in an end cap. The specialized tools and devices which were then needed to safety compress the one piece slip segment unfortunately resulted in undesirable new labor and equipment costs. These costs were deemed undesirable by the oil well drilling operators. U.S. Pat. No. 4,258,804 describes one such one-piece slip segment.

The use of lock on stabilizers, consisting of a body with externally extending blades and two end caps for connecting to the body, has also been suggested to solve the undesirable aspects of nonstandard drill collar stand lengths. One such stabilizer is connected between the pin and box joints on a drill string by positioning an inside locking ring inside the body, and thereafter positioning an outside locking ring on either end of the body with a tapered surface facing the inside locking ring. The two end caps are used to force the rings together within the body to connect the stabilizer to the drill collar. A major difficulty encountered with these arrangements has been the inability to reuse the solid rings after once being attached. This difficulty is due to the fact that the rings become deformed when they are clamped around the drill string. U.S. Pat. No. 3,916,998, U.S. Pat. No. 4,101,179, and U.S. Pat. No. 4,105,262 show combinations of split rings and/or wedging clamps which have traditionally been used for attaching a stabilizer to a drill collar.

SUMMARY OF THE INVENTION

It is an object of the present invention to provide a stabilizer of simple and inexpensive construction, which is releasably connected to a drill collar, is capable of placement anywhere along the drill collar, and can easily be assembled at the drilling platform without specialized equipment and with a minimum expenditure of labor.

In general terms, the invention includes a cylindrical body member or tubular body member with a central bore which is internally threaded at each end. The interior wall surface of the body member consists of an inward double taper along the bore from each threaded end portion toward the middle portion. An end cap is threaded into each end of the body member. The body member and both end caps define a central bore which is large enough to accommodate a drill collar. Inserted between each end cap and the central portion of the body member is a set of slip segments, preferably three in number. The exterior surface of each segment consists of a double-taper where it enters the body member to mate with the interior double-taper of the body member. The interior surface of each slip segment opposite the tapered surfaces of the segments is serrated or otherwise configured to firmly engage a drill collar upon being wedged between its end cap and the body member. The opposite, outer end of each slip segment has a longitudinal groove or recessed portion in its outer surface. This groove or recess is spaced from the outer end of the slip segment, such that the end defines, in effect, a circular flange or lip. A somewhat similar flange or lip is formed internally at the outboard end of each end cap by an internal groove or recess in the end cap. The two sets of grooves and flanges are designed and sized such that, when assembled, the interior flange of an end cap engages the exterior grooves of a set of slip segments, and the exterior flanges of the set of slip segments engage the interior groove of the end cap. A flat spring or wave spring or other similar resiliently compressible member is inserted between the threaded terminus of the end cap lip or flange and the slip segment inboard lip or flange. These springs serve as an aid in increasing the friction between the end cap threads and the body threads to aid in inadvertent loosening of the end cap while the drill string is rotated. In addition, an internal groove or recess is formed in the interior outer end surface of each slip segment to accommodate a snap ring or similar retainer device. A circular spring or similar resiliently compressible member is preferably inserted in the groove or recess, interlocking each end cap with its respective set of slip segments to help ensure a snug relationship between the end cap and the slip segments. A suitable locking device or pin can be used to keep the slip segments from rotating in relation to the body member. A longitudinal groove in the gripping surface of the slip segments cooperates with the locking pin to assist in preventing the rotational movement of the slips.

BRIEF DESCRIPTION OF THE DRAWINGS

The nature and advantages of the invention will become more apparent upon reading the following detailed description of the invention with reference to the drawings in which:

FIG. 1 is an elevational view partly in section showing two stabilizers of the present invention installed on a drill collar in a well;

FIG. 2 is an enlarged elevational view, of one stabilizer, partly in section illustrating a detailed construction of one of the stabilizers shown in FIG. 1.

FIG. 3 is an enlarged elevational view partly in section illustrating a detailed construction of the invention shown in FIG. 2, with the end cap not fully engaged;

FIG. 4 is an enlarged elevational view partly in section illustrating a detailed construction of the invention shown in FIG. 2, with the end cap fully engaged;

DESCRIPTION OF THE PREFERRED EMBODIMENT

Figure 5:
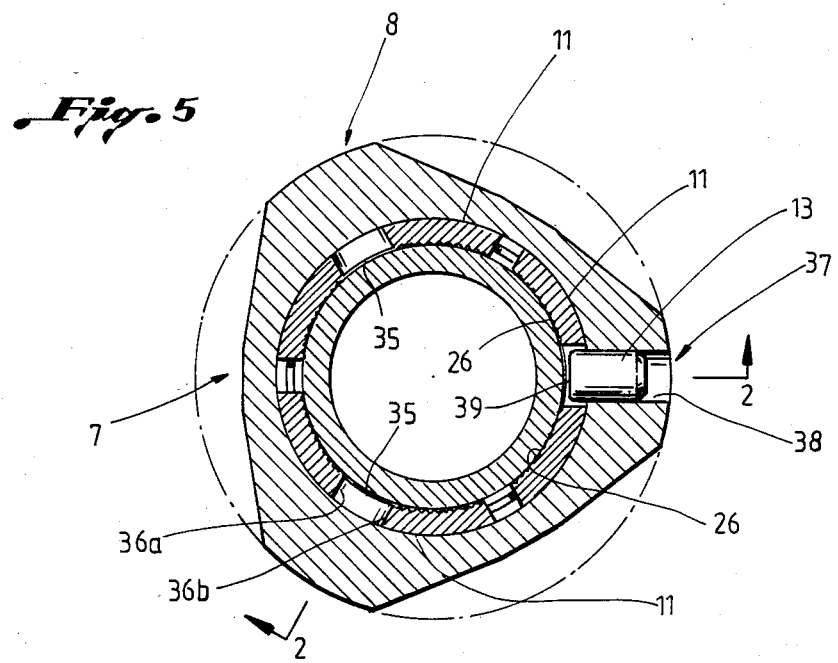
FIG. 5 is a plan view of the present invention detailing the overall configuration and outline of the stabilizer blades, drill collar, slip segments, and locking pin, cut along line 5—5 in FIG. 2.
Figure 6:
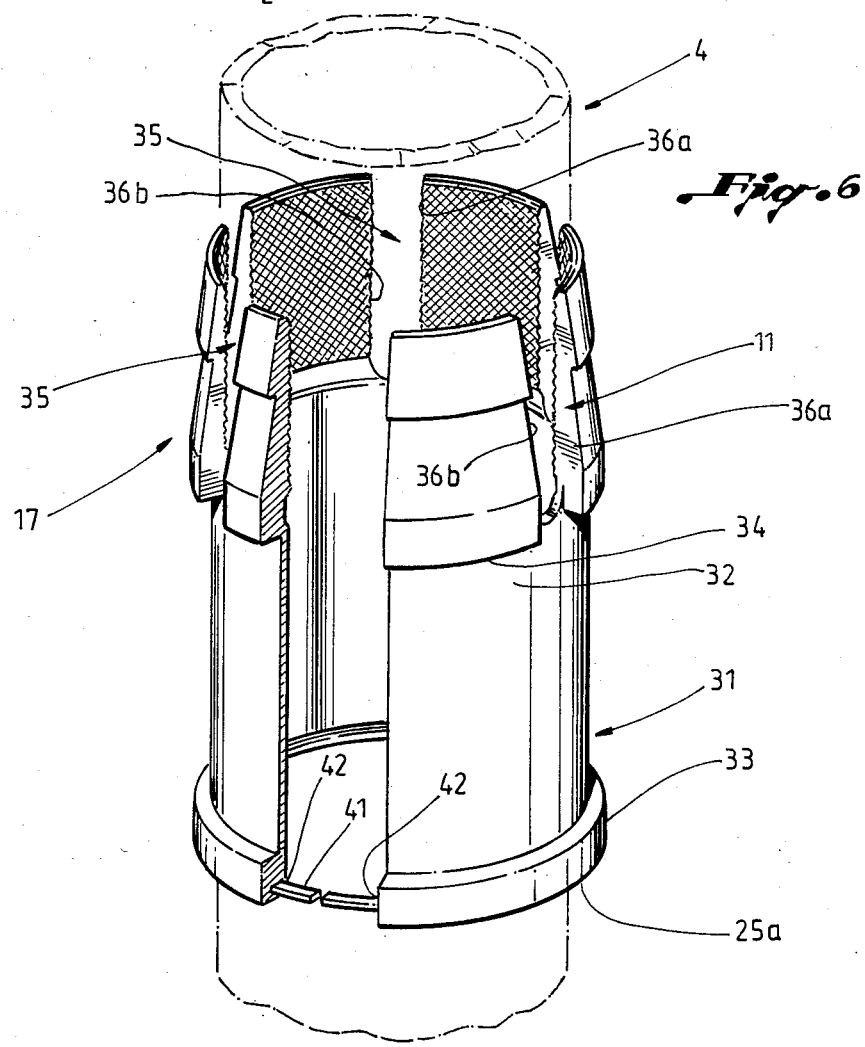
FIG. 6 is a detailed perspective view of the slip segments and the retainer ring utilized to hold the slip segments in place. (While the preferred embodiment contains three slip segments only two are illustrated in FIG. 6 for the purposes of clarity).

FIG. 1 shows a drill string 1 positioned within borehole 2 which is formed by drilling bit 3 in a manner well known in the art. As is also well known, when the drilling bit 3 drills a borehole 2 deeper within the earth formation, it is necessary to add a drill pipe secured to the drill string 1 by conventional pin and box joints as at 5. As illustrated, a single stabilizer of the present invention, generally designated by the numeral 6, is secured to the drill collar 4. It is to be understood, however, that multiple stabilizers may be attached to the drill collars at any desired elevation.

As illustrated in FIG. 2, stabilizer 6 includes a stabilizer body 7 having stabilizer blades 8 extending outwardly therefrom to contact the sides of the well borehole 2 (FIG. 1). Stabilizer 6 includes stabilizer body 7, end caps 9 and 10, a plurality of slip segments 11, a plurality of renitent means 12 and pin means 13.

Stabilizer body 7 includes a central section 14 having an interior surface 15 which fits around the drill collar 4. Above and below the central interior surface 15 are two oppositely double-tapered surfaces 16a and 16b and 17a and 17b extending away from the central section interior surface 15. Each of the tapered surfaces 16a and 17a extends outwardly toward the second taper 16b and 17b respectively. The second taper 16b and 17b extend towards the upper and lower interior thread sections 18.

As best illustrated in FIG. 2, the stabilizer blades 8 extend outwardly to contact the well bore 2 (FIG. 1) as is well known in the art. The blades also extend substantially the entire length of the stabilizer body 7, where they terminate at the exterior ends 19 and 20 of interior threaded sections 18.

Each of the end caps 9 and 10 includes a collar 21 for mounting around the drill collar 4 and a plurality of exterior threads 22 for engaging the interior threads 18 of the stabilizer body 7. The exterior threads 22 and the interior threads 18 may be cut in a manner which results in a "locking thread." The "locking thread" is accomplished by cutting a wide interior thread 18 and a narrow exterior thread 22. (See FIGS. 3 and 4.) As more fully illustrated in FIGS. 3 and 4 the renitent means 12 partially aids in increasing the friction between the interior and exterior threads. This aids in diminishing the possibility of loosening of the end cap for the first $\frac{1}{4}$ to $\frac{1}{2}$ turn of the end cap. An end cap retainer lip 23 is provided near the outboard end of each threaded section 22 and forms a groove or slotted section 24 defined by the lip or extension 23 and corner or edge 25 of the end cap 10.

As illustrated in FIGS. 2, 3 and 4, clamping wedge-shaped slip segments 11 include interior surface 26, covered by a plurality of diamond shaped teeth 27, or the like, for securely gripping the drill collar 4. The exterior surface 28 of each slip segment 11 includes a double-tapered surface area 29a and 29b which complementarily matches the double-tapered surface 16a and 16b or 17a and 17b respectively, as the case may be, of the stabilizer body 7, adjacent the teeth 27 to form a wedge shaped section 30. The exterior surface of each slip segment 11 also forms a slotted section 31 which includes a renitent retaining and receiving slot 32 formed by the lip 33 and edge 34. As illustrated in FIGS. 3 and 4, the lip 33 overlaps with the lip 23 of end cap 10 to retain slip segment 11 in position. A plurality of renitent means 12, which may consist of flat wave springs or other suitable compressible resilient members commonly known in the art, are positioned in the retaining slots 32 to continually force the slip segments 11 toward the center section 14 of the stabilizer body 7. The renitent means together with the threaded engagement of the exterior threads 22 of end cap 9 and 10 with the interior threads 18 of the stabilizer body 7, thus cause the wedge shaped slip segment members 11 to tightly grip the drill collar 4 as the end caps 9 and 10 are tightened on to stabilizer body 7.

As illustrated in FIG. 5, a plurality of slip segments 11 extend partially around the drill collar 4. Each slip segment has a longitudinal slot 35 defined by walls 36a and 36b. As the slip segments 11 are forced toward the center of the body 14, the longitudinal slot 35 of one of the slip segments 11 slides past pin means 13. As illustrated in FIGS. 2, 3, 4 and 5, pin means 13 are inserted through openings 37 which extend through the stabilizer body 7. Pins 13 are welded as at 38 to the stabilizer body 7. The pin means 13 cooperating with the slip segment longitudinal slots 35 prevent relative rotational movement between the slip segments 11 and the stabilizer body 7.

As further illustrated in FIGS. 2, 3, 4 and 5, pins 13 extend into openings 37 so that the head 39 extends through the opening 37 and into the longitudinal slot 35. It will be noted that pin members 13 do not extend past the interior surface 26 of the slip segments 11 so as to avoid wear and tear of pin members 13 and the adjacent drill collar 4.

As end caps 9 and 10 are threaded into the threaded interior section of body 7, the renitent means 12 are compressed, and thereby exert forces on the edge 34 of the slip segments 11 to wedge slip segments 11 against the central section 14 of the stabilizer body 7. Additionally tightening of end caps 9 and 10 causes end cap edge 25 to come in contact with slip segment edge 25a thereby forcing slip segments 11 towards the central part of the stabilizer body 7. Tightening the end caps 9 and 10, causes end caps 9 and 10 to move inward with respect to the body 7 which causes slip segments 11 to move inward and create a wedge action against the tapered surfaces 29a and 29b and 17a and 17b respectively such that the slip segments 11 grip the drill collar 4.

The longitudinal slot 35 in one of the slip segments 11 engages pin 13 (FIG. 4) and thereby prevents rotational movement of one of the slip segments 11 with respect to the body 7. The rotational movement of one slip segment 11 being restrained thereby restrains the rotational movement of the balance of the slip segments 11.

Another unique and innovative aspect of the present invention distinguishing it from the prior art is the ease of field assembly. This assembly can be accomplished without special tools and clamping vises. In particular, a safe, economical and efficient system is provided for assembling the slip segments 11 onto the end caps 9 and 10. As noted earlier, the prior art has used a one-piece slip which requires a vase for compressing it into place. In the present invention a plurality of slip segments 11 are readily positioned by placing the lips 33 in the end cap grooves or slotted sections 24 (see FIGS. 3 and 4).

As illustrated in FIGS. 2, 3 and 4, the end cap retainer lip 23 and the slip segment lips 33 are placed in direct contact by the renitent means 12 placed in the renitent means retaining and receiving slot 32. A retainer ring 41 is placed in the retainer ring slot 42 formed on the interior surface 26 of lip 33 of the slip segment 11. Once the slip segments 11 are assembled onto the end caps 9 and 10, the slip segments 11 are partially held in place by the renitent means 12. The retainer ring 41 facilitates assembly by keeping the slip segments apart and in place during placement of the stabilizer body 7 onto the drill collar 4.

The modular assembly of the plurality of slip segments 11 onto end caps 9 and 10 permits the use of slip segments 11 of various thicknesses. This new and innovative feature compensates for variations in the outside diameter of a drill collar due to wear and tear of the drill collar, a problem commonly encountered in the oil field. Additionally, drill collar outside diameters will vary depending on manufacturing practices of the drill collar manufacturer with respect to industry tolerances. Thus, a stabilizer body 7 and end caps 9 and 10 of a common trade size may be utilized in many applications where the outside diameter of the drill collar varies by merely changing the thickness of the slip segments 11.

The final phase of the assembly consists of threading the exterior threads 22 of end caps 9 and 10 to the interior threads 18 of the stabilizer body 7. The retainer ring 41 aids in the retention of the slip segments 11 until the entire stabilizer 6, including the body 7, the end caps 9 and 10, and the slip segments 11, are placed over the drill collar 4.

Referring to FIG. 3 the slip segments 11 are illustrated with the end cap 10 in its untightened position. Therefore slip segments 11 are not gripping the drill collar 4. A slip segment lip 43 is formed between the slip segment taper 29a and the slip segment taper 29b. The slip segment lip 43 rests on the stabilizer body ledge 44 formed by the stabilizer body taper 17a and stabilizer body taper 17b. When the end cap 10 is sufficiently unthreaded the slip segment lip 43 rests on stabilizer body ledge 44 tending to prevent further loosening of end cap 10.

Referring to FIG. 4 slip segments 11 are illustrated with end cap 10 in its tightened position. Slip segment 11 moves toward the central section 14 of stabilizer body 7 thereby urging slip segments 11 against drill collar 4. This urging is accomplished by the wedging action of taper section 29a sliding on tapered surface 17a and tapered surface 29b sliding on tapered surface 17b.

In the event that the end cap 10 loosens during drilling operations the end cap 10 and slip segments 11 are held captive in the stabilizer body assembly by the slip segment lip 43 coming to rest on the stabilizer body ledge 44. When end cap 10 is unthreaded slip segment lip 43 comes to rest on stabilizer body ledge 44 tending to prevent further loosening of end cap 10.

To remove the stabilizer body assembly from the drill collar the pin and box joint 5 illustrated in FIG. 1 must be disassembled. The entire stabilizer body assembly is then lifted out of place. Further disassembly can then be accomplished by removing the snap ring 41 and manually moving slip segments 11 radially inward toward the center of the stabilizer body. This movement of the slip segments 11 displaces slip segment lip 43 from the stabilizer body ledge 44 thereby permitting further loosening of end cap 10.

Another unique and innovative aspect of the present invention is that inadvertent loss of the slip segments 11 is minimized in the event an end cap 9 or 10 is unthreaded from the stabilizer body 7. As an end cap 9 or 10 is unthreaded from the stabilizer body 7, the end cap lip 23 helps to retain the slip segments 11 in place. Additionally, the end cap lip 23 urges the slip segments 11 outward by exerting a longitudinally outward force on the lips 33 of the slip segments 11. Thus, the traditional need to utilize a sledge hammer or other similar device to remove wedging rings from the stabilizer body and drill string is avoided. The slip segments 11 are urged outward by end cap 10 until slip segment lip 43 rests on stabilizer body ledge 44 at which time further loosening of end cap 10 is minimized. Since end cap 10 cannot fully unthread the slip segments 11 are prevented from inadvertently falling out of place.

As illustrated in FIG. 1, the end caps 9 and 10 are preferably equipped with interengaging locking teeth (also known as racheting teeth) 45 at the point farthest from the stabilizer body 7. These teeth solve a problem commonly encountered in the oil patch. Should a stabilizer 6 slide down the drill collar 4 after it has been in place and operating, the borehole can be chased with equipment commonly used in the oil field. The racheting teeth 45 on the stabilizer 6 are then utilized to grip the racheting teeth on the stabilizer 46 farther down in the borehole 2. In the event the stabilizer farthest down on the drill collar 4 loosens, the racheting teeth on the last stabilizer will grip the blades on the "end of string stabilizer" (not shown in FIG. 1) or the upper lugs 47 on the top end of a conventional drill bit 3.

The contact of racheting teeth 45 of end cap 10 of stabilizer body 6 with the racheting teeth 45 on end cap 9 of stabilizer body 46 permits the end caps 9 and 10 of stabilizer 6 to be tightened by applying a chasing tool to end cap 9 of stabilizer 6. Thus, end caps 9 and 10 of stabilizer 6 are tightened by utilizing end cap 9 of stabilizer 46 to keep stabilizer 6 from rotating about the drill collar 4. The contruction of the racheting teeth enables tightening of the end caps 9 and 10 when the stabilizer body 6 is turned in one direction, but the end caps 9 and 10 cannot be loosened when the stabilizer body 6 is turned in the opposite direction.

Once a stabilizer is assembled as herein described, slipped over the drill collar 4 and end caps 9 and 10 tightened, the diamond shaped teeth 27 tightly grip the drill collar 4 due in part to the spring or renitent means 12 urging the slip segments 11 toward the central section 14 of the stabilizer body 7 and from wedging action of the slip tapers 29a and 29b against the stabilizer body tapers 17a and 17b by the engagement of exterior threads 22 of end caps 9 and 10 with interior threads 18 of the stabilizer body 7. Thus, movement of thè stabilizer body 7 relative to the different parts of the stabilizer body and drill collar 4 is prevented.

Description of the function and operation of end cap 10 applies equally to end cap 9. It is to be understood that end cap 9 is similar to end cap 10 and operates in the same fashion.

There has been provided in accordance with the present invention a stabilizer which has been described in terms of a specific embodiment thereof; however, many alternatives, modifications and variations will be apparent to those skilled in the art from the foregoing description. Accordingly, this disclosure is intended to embrace all such alternatives, modifications and variations that fall within the spirit and scope of the appended claims.

What is claimed is:

1. A stabilizer for use on a drill collar which comprises:
    (a) a cylindrical body with: (i) a longitudinal bore, (ii) internally threaded end portions, (iii) a double-tapered inner surface extending between each said end portion and a relatively thicker central portion;
    (b) a hollow end cap at each end of said body threaded externally to mate with the corresponding internally threaded portion of said body and having a circumferential groove in the internal surface thereof near the outboard end thereof;
    (c) a plurality of double-tapered slip segments within each end of said body adapted to mate and wedge against the double-tapered inner surface at said end of said body upon entry of one of said end caps into said end of said body; said slip segments being distributed around said body, each said slip segment having: (i) a longitudinal slot, and (ii) a circumferential recess in the exterior surface thereof near the outboard end of said slip segment facing said end cap, said circumferential recess defining a retaining lip on the external surface of said slip segment which fits within said circumferential groove in said end cap;
    (d) an expansible member configured to engage the inner surfaces of said slip segments as to urge the lips of said slip segments radially into said circumferential recess of said end cap;
    (e) a compressible renitent member positioned within said slip segment recess between the threaded terminus of said end cap and said slip segment so as to be compressed upon entry of said end cap into said body; and
    (f) a locking device interengaging the said slip segment longitudinal slot and said body to resist rotational movement therebetween.

2. A downhole tool for positioning on a drill collar, comprising:
    (a) a body with a longitudinal bore internally threaded at each end and an internal double-tapered surface between each threaded end and the relatively thicker central section of said body;
    (b) an end cap with exterior threads, and an interior circumferential groove, threaded into each end of said longitudinal bore;
    (c) a plurality of slip segments with: (i) interior gripping teeth, (ii) a longitudinal slot, (iii) a circumferential retainer ring slot, (iv) double-tapered surface matching the said interior double-tapered surface of said body, and (v) a circumferential lip configured to fit said circumferential grooves of said end caps;
    (d) a retainer ring inserted in said retainer ring slots exerting a radially outward force on said slip segments;
    (e) a locking device positioned at each end of the interior of said body to resist rotational movement of said slip segments relative to said body.

3. The structure as set forth in claim 1 or 2 wherein: said locking device consists of a plurality of locking pins at each end of said body to engage the longitudinal slots on each of said slip segments.

4. The structure as set forth in claim 1 or 2 wherein: said plurality of slip segments consists of three slip segments.

5. A downhole tool capable of positioning on a drill collar, comprising:
    (a) a tubular body with interior threads and an interior double-tapered surface at each end of said body;
    (b) separate end caps with exterior threads and a circular receiving groove threaded into each end of said body;
    (c) a plurality of slip segments fitting in the receiving groove of said end cap with: (i) gripping teeth, (ii) a double-tapered surface on each segment matching the said interior double-tapered surface of said body, (iii) a longitudinal slot, (iv) a lip on each slip segment on the end opposite the gripping teeth and, (v) a retainer ring slot in each slip segment;
    (d) a retainer ring placed in each set of said retainer ring slots exerting outward force on said slip segments;
    (e) and a locking pin positioned at each end of the interior of said body preventing rotational movement of said slip segments.

6. A slip-on stabilizer for positioning on a drill collar, comprising:
    (a) a cylindrical stabilizer body with a bore adapted to fit around the exterior of a drill collar having: (1) threads on the interior surface of each end portion of said body, (2) at least one tapering surface on the interior of said body said tapering surface extending from the threaded end portion toward the center of the body, and tapered toward the relatively thicker center portion of the body;
    (b) an end cap at each end of the stabilizer body adapted to fit over the exterior of a drill string and having: (1) threads on the exterior surface of one end of said cap for threading into the corresponding said interior threads of said body, (2) a circumferential groove formed in the interior surface of each said end cap and positioned opposite the threaded end of said end cap, (3) a slot on the exterior surface of each said cap positioned at the end opposite from the threaded end which is capable of gripping an end cap on an adjacent stabilizer body and tightening said end cap on the adjacent stabilizer body when turned in one direction but slipping when turned in the opposite direction;
    (c) a set of slips for each of said end caps, each set having a plurality of slip segments, each of said slip segments having an outside diameter adapted to fit the inside diameter of said end cap, each slip segment having: (i) a circumferential recess defining a lip on the outer surface at one end sized to fit within said circumferential groove of the corresponding end cap, (ii) an interior surface having teeth for gripping the exterior surface of a drill collar, (iii) an exterior surface with at least one tapered surface adapted to fit within said adjacent tapered surface on the interior of said body, (iv) a renitent device receiving and retaining slot, (v) a retaining lip section extending into and being received by said end cap circumferential groove for retaining said slip segment in position relative to said body and said drill string, (vi) a circumferential retainer ring slot on the interior of said slip segment adjacent the end opposite said gripping teeth, and (vii) a longitudinal slot;

(d) a retainer ring for insertion in said retainer ring slot of each said slip segment to exert a radially outward force on said segments;

(e) a renitent means mounted in said renitent device receiving slot retaining each of said slips relative to said cap and exerting an outward force against said end cap exterior threads;

(f) a locking pin positioned at each end of the interior of said body and piercing said body to engage at least one slip segment longitudinal slot and resist rotational movement of said slip segments relative to said body.

7. A slip-on stabilizer for positioning on a drill collar, comprising:

(a) a cylindrical stabilizer body with a bore adapted to fit around the exterior of a drill collar having: (1) threads on the interior surface of each end portion of said body, (2) double tapering surfaces on the interior of said body one tapered surface extending from each threaded end portion toward the center of the body ending at a point where the second tapered surface commences, the second tapered surface commencing at the end of the first tapered surface, and tapered toward the relatively thicker center portion of the body;

(b) an end cap at each end of the stabilizer body adapted to fit over the exterior of a drill collar and having: (1) threads on the exterior surface of one end of said cap for threading into the corresponding said interior threads of said body, (2) a circumferential groove formed in the interior surface of each said end cap and positioned opposite the threaded end of said end cap, (3) rachet teeth on the exterior surface of each said cap positioned at the end opposite from the threaded end which are capable of gripping the rachet teeth on an end cap on an adjacent stabilizer body and tightening said end cap on the adjacent stabilizer body when turned in one direction but slipping when turned in the opposite direction;

(c) a set of slips for each of said end caps, each set having: (1) a plurality of slip segments, each of said slip segments having an outside diameter adapted to fit the inside diameter of said end cap, each slip segment having: (i) a circumferential recess defining a lip on the outer surface at one end sized to fit within said circumferential groove of the corresponding end cap, (ii) an interior surface having teeth for gripping the exterior surface of a drill collar, (iii) an exterior double-tapered surface adapted to fit within said adjacent double-tapered surfaces on the interior of said body, (iv) a renitent device receiving and retaining slot, (v) a retaining lip section extending into and being received by said end cap circumferential groove for retaining said slip segment in position relative to said body and said drill string, (vi) a circumferential retainer ring slot on the interior of said slip segment adjacent the end opposite said gripping teeth, and (vii) a longitudinal slot;

(d) a retainer ring for insertion in said retainer ring slot of each said slip segment to exert a radially outward force on said segments;

(e) a renitent means mounted in said renitent device receiving slot retaining each of said slips relative to said cap and exerting an outward force against said end cap exterior threads;

(f) a locking pin positioned at each end of the interior of said body and piercing said body to engage at least one slip segment longitudinal slot and resist rotational movement of said slip segments relative to said body.

8. The structure as set forth in claim 5, 6, or 7 wherein: said threads on the interior surface of each end of said body and said threads on the exterior surface of said end caps consist of locking threads.

9. The structure as set forth in claim 5, 6, or 7 wherein said plurality of slip segments consists of three slip segments.

10. The structure as set forth in claim 5, 6, or 7 wherein said retainer ring shall have a rectangular cross-sectional area.

11. The structure as set forth in claim 5, 6, or 7 wherein: said renitent device is a flat wave spring.

12. The structure as set forth in claim 5, 6, or 7 wherein: said locking pin consists of a plurality of locking pins at each end of said body.

13. A stabilizer for use on a drill collar which comprises:

(a) a cylindrical body with: (i) a longitudinal bore, (ii) internally threaded end portions, (iii) at least one tapered surface extending between each said end portion and a relatively thicker central portion;

(b) a hollow end cap at each end of said body threaded externally to mate with the corresponding internally threaded portion of said body and having a circumferential groove in the internal surface thereof near the outboard end thereof;

(c) a plurality of slip segments within each end of said body with a separate tapered surface adapted to mate and wedge against each tapered inner surface at said end of said body upon entry of one of said end caps into said end of said body; said slip segments being distributed around said body, each slip segment having: (i) a longitudinal slot and (ii) a circumferential recess in the exterior surface thereof near the outboard end of said slip segment facing said end cap, said circumferential recess defining a retaining lip on the external surface of said slip segment which fits within said circumferential groove in said end cap;

(d) an expansible member configured to engage the inner surfaces of said slip segments as to urge the lips of said slip segments radially into said circumferential groove of said end cap;

(e) a compressible renitent member positioned within said slip segment recessed between the threaded terminus of said end cap and said slip segment so as to be compressed upon entry of said end cap into said body; and (f) a locking device interengaging the said slip segment longitudinal slot and said body to resist rotational movement therebetween.

14. A slip on stabilizer for positioning on a drill collar comprising:

(a) a cylindrical stabilizer body with a bore adapted to fit around the exterior of a drill collar and having: (1) threads on the interior surface of each end portion of said body, (2) at least one tapering surface on the interior of said body tapered toward the relatively thicker center portion of the body;

(b) an end cap at each end of the stabilizer body adapted to fit over the exterior of a drill collar and having: (1) threads on the exterior surface of one end of said cap for threading into the corresponding said threads on the interior surface of said body, (2) a circumferential groove formed in the interior surface of each said end cap and positioned opposite the threaded end of said end cap, (3) ratchet teeth on the exterior surface of each said cap positioned at the end opposite from the threaded end which are capable of gripping the ratchet teeth on an end cap on an adjacent stabilizer body and tightening said end cap on the adjacent stabilizer body when turned in one direction but slipping when turned in the opposite direction;

(c) a set of slips for each of said end caps, each set having: (1) at least two slip segments, each of said slip segments having an outside diameter adapted to fit the inside diameter of said end cap, each slip segment having: (i) a circumferential recess defining a lip on the outer surface at one end sized to fit within said circumferential groove of the corresponding end cap, (ii) an interior surface having teeth for gripping the exterior surface of a drill collar, (iii) at least one exterior tapered surface complimentary matching the tapered surface of said body, (iv) a renitent device receiving and retaining slot, (v) a retaining lip section extending into and being received by said end cap's circumferential groove for retaining said slip segment and positioned relative to said body and said drill collar, (vi) a circumferential retainer ring slot on the interior of said slip segment adjacent the end opposite said gripping teeth, and (vii) a longitudinal slot;

(d) a retainer ring for insertion in said retainer ring slot of each said slip segment to exert a radially outward force on said segments;

(e) a renitent means mounted in said renitent device receiving slot retaining each of said slips relative to said cap and exerting an outward force against said end cap exterior thread; and (f) a locking pin positioned at each end of the interior of said body and piercing said body to engage at least one slip segment longitudinal slot and resist rotational movement of said slip segments relative to said body.

* * * * *